United States Patent
Ward

(10) Patent No.: US 6,675,564 B1
(45) Date of Patent: Jan. 13, 2004

(54) MOWER FOR CUTTING UNDER FENCES AND AROUND FENCE POSTS

(75) Inventor: Troy Ward, Avella, PA (US)

(73) Assignee: H-Tide Innovations, Inc., Avella, PA (US)

( * ) Notice: Subject to any disclaimer, the term of this patent is extended or adjusted under 35 U.S.C. 154(b) by 0 days.

(21) Appl. No.: 10/200,702

(22) Filed: Jul. 22, 2002

(51) Int. Cl.[7] .................. A01D 75/18; A01D 34/64
(52) U.S. Cl. .................. 56/10.4; 56/14.9; 56/DIG. 3
(58) Field of Search .................. 56/10.4, 14.7–16.3, 56/DIG. 3, DIG. 10, DIG. 15

(56) References Cited

U.S. PATENT DOCUMENTS

| | | | |
|---|---|---|---|
| 2,898,725 A | * 8/1959 | Roesel | 56/294 |
| 3,045,413 A | 7/1962 | Sheffer | |
| 3,138,208 A | * 6/1964 | Simms | 172/38 |
| 3,665,685 A | * 5/1972 | Allard | 56/10.4 |
| 3,721,074 A | * 3/1973 | Heth | 56/10.4 |
| 4,206,580 A | * 6/1980 | Truax et al. | 56/10.4 |
| 4,420,925 A | * 12/1983 | Webster | 56/15.9 |
| 4,573,306 A | * 3/1986 | Smith et al. | 56/10.4 |
| 4,802,327 A | * 2/1989 | Roberts | 56/15.2 |
| 4,901,508 A | 2/1990 | Whatley | |
| 5,035,107 A | * 7/1991 | Scarborough | 56/10.4 |
| 5,425,224 A | * 6/1995 | Downey et al. | 56/15.8 |
| 5,483,789 A | 1/1996 | Gummerson | |
| 5,771,672 A | * 6/1998 | Gummerson | 56/15.5 |

* cited by examiner

Primary Examiner—Robert E. Pezzuto
Assistant Examiner—Alicia Torres
(74) Attorney, Agent, or Firm—Webb Ziesenheim Logsdon Orkin & Hanson, P.C.

(57) ABSTRACT

A mower suitable for attachment to a utility vehicle and adapted to follow terrain and retract in response to an immovable obstacle, the mower generally including an attachment frame configured to be pivotally attached to the utility vehicle, a secondary frame pivotally connected to the attachment frame, and a housing positioned adjacent to the secondary frame and being laterally movable with respect to the secondary frame, wherein the housing retracts in a direction toward the secondary frame when contact occurs between the housing and the immovable obstacle and automatically returns to an approximate pre-contact position when contact between the housing and the immovable obstacle is eliminated.

16 Claims, 3 Drawing Sheets

MOWER FOR CUTTING UNDER FENCES AND AROUND FENCE POSTS

BACKGROUND OF THE INVENTION

1. Field of the Invention

The present invention relates to mowers and, more particularly, to a mower having a cutting blade which retracts in response to an obstruction.

2. Brief Description of the Prior Art

U.S. Pat. No. 3,045,413 to Sheffer generally discloses a cutting blade and guard attached to a springed, laterally extending post. The cutting blade, guard, and post are supported by a hydraulic lever arrangement. The cutting blade is rotated by a motor, belt, and pulley.

U.S. Pat. No. 4,901,508 to Whatley generally discloses a fence row mower with a plurality of rotary blade units driven by a series of pulleys. Pressure cylinders are used to maneuver the plurality of rotary blade units.

In general, the known prior art must be supported or maneuvered by complex means, such as by pressurized fluid systems. This is expensive and adds to overall maintenance costs. Moreover, the prior art teaches using complicated blade drive units to rotate a cutting blade. Therefore, a need exists for a mower with a simplified cutting blade driver and a cutting blade that extends and retracts quickly from a utility vehicle without the need for complex fluid pressure systems.

SUMMARY OF THE INVENTION

In order to help satisfy the needs not currently met by the prior art, one embodiment of the present invention generally includes a mower adapted to follow terrain and retract in response to an immovable obstacle. The mower generally includes a utility vehicle, an attachment frame configured to be pivotally attached to one side of the utility vehicle, a secondary frame pivotally connected to the attachment frame, and a housing positioned adjacent to the secondary frame. The housing is preferably laterally movable with respect to the secondary frame via biasing means. In one method of operation, the housing retracts in a direction toward the secondary frame when contact occurs between the housing and the immovable obstacle and automatically returns to a pre-contact position when contact between the housing and the immovable obstacle is eliminated.

In sum, the present invention seeks to improve the mower art by providing a mower with an automatically biased cutting blade assembly. No hydraulic lifts or actuators are required to move the cutting blade assembly or to pivot the cutting blade assembly in response to uneven terrain. The cutting blade is directly attached to a vertical shaft, which in turn, is directly connected to a motor. When an immovable object, such as a fence post, is encountered, the automatic biasing action of the cutting blade housing helps to quickly and automatically return the cutting blade to a pre-contact position and significantly eliminates spots of uncut vegetation growing between adjacent fence posts.

These and other advantages of the present invention will be clarified in the description of the preferred embodiment taken together with the attached drawings in which like reference numerals represent like elements throughout.

DETAILED DESCRIPTION OF THE INVENTION

Figure 1:
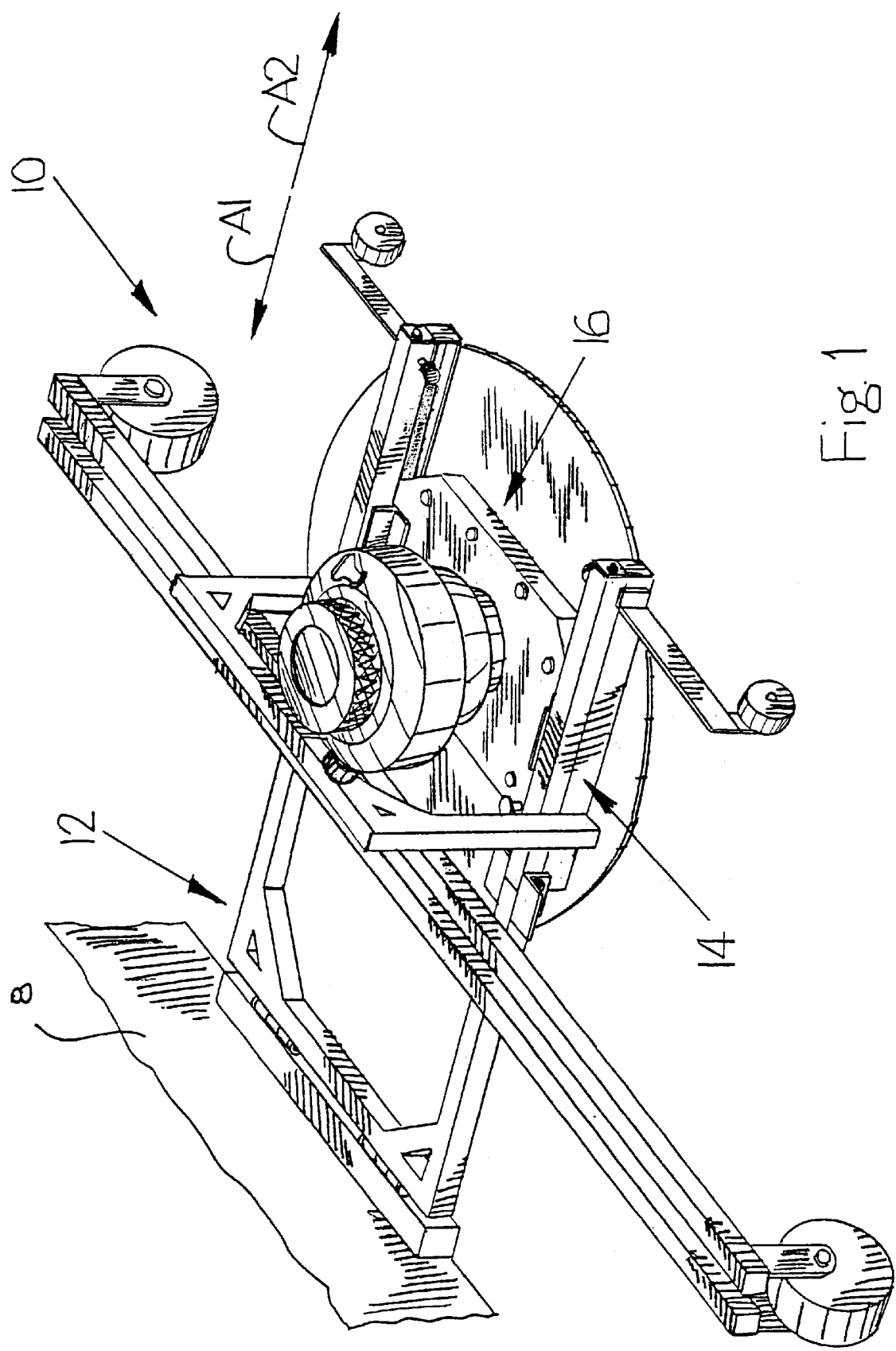
FIG. 1 is a top perspective view of a mower according to the present invention.

A mower 10 according to one embodiment of the present invention is generally shown in FIG. 1. The mower 10 includes an attachment frame 12 configured to be pivotally attached to a utility vehicle 8, a secondary frame 14 pivotally connected to the attachment frame 12, and a cutting blade assembly 16 laterally movable relative to the cutting direction in the A1 and A2 directions with respect to the secondary frame 14. The attachment frame 12, secondary frame 14, and cutting blade assembly 16 are preferably made from metal, such as steel or other suitable material, unless otherwise specified.

Figure 2:
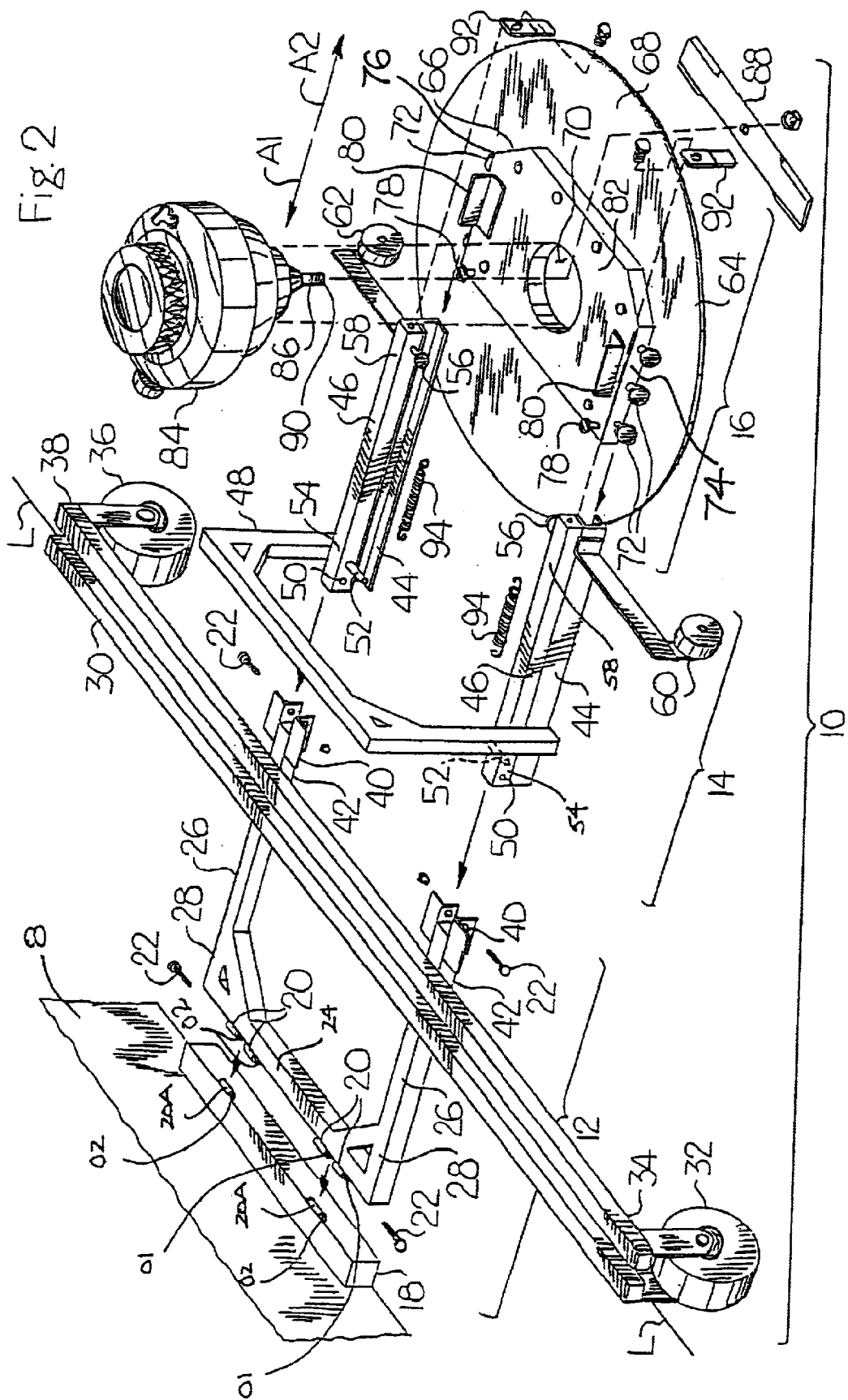
FIG. 2 is a top exploded perspective view of the mower shown in FIG. 1.

As shown in greater detail in FIG. 2, the attachment frame 12 is configured to be pivotally connected to a hitch 18, which in turn, is rigidly connected to the utility vehicle 8. In the preferred embodiment, the pivotal connection is acquired by aligning orifices O1 defined by spaced apart pin receiving cylinders 20 positioned adjacent to a first frame member 24 of the attachment frame 12, with corresponding orifices O2 defined by second pin receiving cylinders 20A attached to the hitch 18 and inserting pins 22 through the aligned orifices O1, O2. The combination of the spaced apart pin receiving cylinders 20 and the second pin receiving cylinders 20A defines a first articulated joint.

In addition to the first frame member 24, the attachment frame 12 further includes two, spaced apart second frame members 26. Each of the two, spaced apart second frame members 26 have a first frame end 28, with each first frame end 28 connected to the first frame member 24. Each of the two, spaced apart second frame members 26 are preferably oriented perpendicular to the first frame member 24.

A first wheel support 30 is generally positioned perpendicular to the two, spaced apart second frame members 26 and is preferably spaced away from and substantially parallel to the first frame member 24. The first wheel support 30 can be a single bar or the spaced apart dual bar shown in FIG. 2. A first wheel 32 is positioned adjacent to a first support end 34 of the first wheel support 30, and a second wheel 36 positioned adjacent to a second support end 38 of the first wheel support 30. The first and second wheels 32, 36 may be made from rubber or plastic and are preferably configured to roll in a direction coincident with an imaginary longitudinal axis L extending through the first wheel support 30.

The secondary frame 14 is pivotally connected to the attachment frame 12 via second joint brackets 40 positioned adjacent to second frame ends 42 of the two, spaced apart second frame members 26, pin holes 50 (discussed below), and pins 22. This combination is herein defined as a second articulated joint. The secondary frame 14 generally includes two, spaced apart, C-shaped channel members 44, each connected to a corresponding channel bar 46. The two, spaced apart channel members 44 and corresponding channel bars 46 are connected to one another by a generally C-shaped retention bar 48.

Each channel bar 46 defines the pin holes 50 discussed above and movement restraint pins 52 at a third end 54 and retention member posts 56 at a fourth end 58. A third wheel 60 is positioned adjacent to the fourth end 58 of one of the two, spaced apart channel members 44, and a fourth wheel 62 is positioned adjacent to the fourth end 58 of the other one of the two, spaced apart channel members 44. The third wheel 60 and the fourth wheel 62, which may be made from rubber, plastic, or other suitable material, are also aligned to travel in the same direction as the first wheel 32 and the second wheel 36.

The cutting blade assembly 16 is laterally movable in the A1 and A2 directions with respect to the secondary frame 14. The cutting blade assembly 16 generally includes a housing 64, with the housing 64 preferably defining a circularly-shaped outer perimeter. A motor mount 66 is attached to a first top surface 68 of the housing 64. Both the motor mount 66 and the housing 64 define a coincident motor shaft orifice 70.

One or more rollers 72 are positioned along first and second opposing sides 74, 76 of the motor mount 66. The rollers 72 are each oriented to be received by a corresponding one of the two, spaced apart channel members 44 of the secondary frame 14.

Second retention member posts 78 and movement restriction brackets 80 extend from a second top surface 82 of the motor mount 66. A motor 84 is mounted to the second top surface 82 of the motor mount 66, so that a vertical motor shaft 86 extending from the motor 84 extends through the motor shaft orifice 70. A rotating cutting blade 88 is attached to a free end 90 of the vertical motor shaft 86 and secured to the vertical motor shaft in the conventional manner.

When the cutting blade assembly 16 is installed in the two, spaced apart channel members 44 via the rollers 72, end caps 92 are installed to prevent the cutting blade assembly 16 from rolling out of the two, spaced apart channel members 44.

Retention members 94, such as compressible springs, are connected to the second retainer member posts 78 are positioned on the second top surface 82 of the motor mount 66, and the retention member posts.56 positioned at the fourth end 58 of each of the channel bars, 46.

Figure 3:
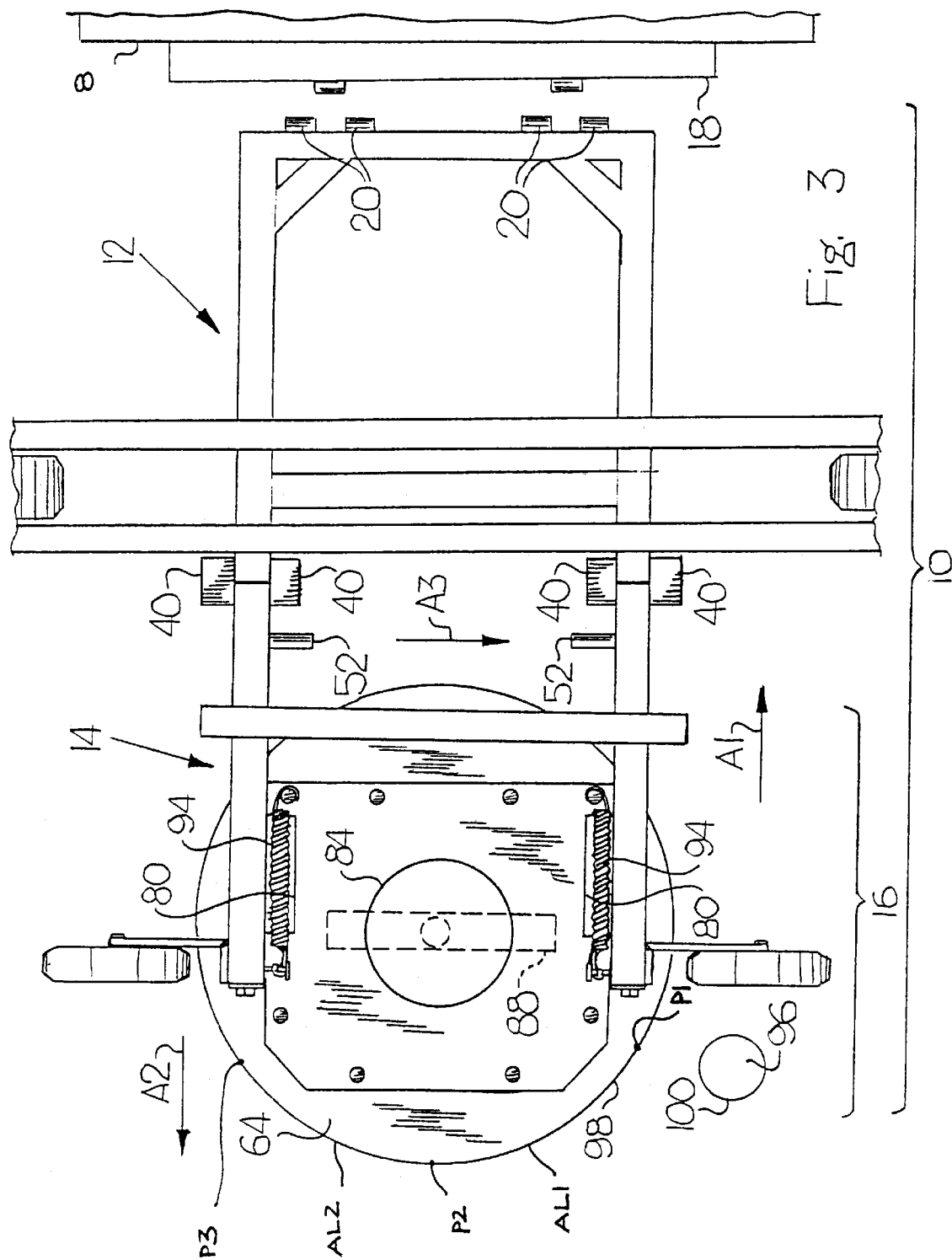
FIG. 3 is a top plan view of the mower shown in FIGS. 1 and 2.

FIG. 3 shows a top plan view of the mower 10 described in FIGS. 1 and 2. In one method of operation, the attachment frame 12 is pivotally connected to one side of a utility vehicle 8, such as a four-wheeled motorcycle or other suitable conveyance. The motor 84 is then engaged, causing the cutting blade 88 to rotate. As the utility vehicle 8 and mower 10 move in the A3 direction, the rotating cutting blade 88 cuts a swath in vegetation.

As the utility vehicle continues to move in the A3 direction, an imaginary point P1 on an outer periphery 98 of the housing 64 preferably contacts an exterior surface 100 of a post 96. Continued movement of the utility vehicle 8 in the A3 direction causes the outer periphery 98 of the housing 64 to travel in a direction toward imaginary point P2, along arc length AL1. Assuming that the utility vehicle 8 maintains a constant distance from the post 96, the cutting blade assembly is gradually forced in the A1 direction as the relative position of the housing 64, with respect to the post 96, changes over time from the P1 position to the P2 position. Movement of the cutting blade assembly 16 in the A1 direction is stopped if the movement restriction brackets 80 contact the movement restraint pins 52.

Once the imaginary point P2 on the outer periphery 98 of the housing 64 is approximately coincident with the post 96, continued movement of the utility vehicle 8 in the A3 direction preferably causes a second arc length AL2 of the outer periphery 98 of the housing 64 to contact the exterior surface 100 of the post 96 in the P2 to P3 direction, over time. As contact between the exterior surface 100 of the post 96 and the second arc length AL2 portion of the outer periphery 98 of the housing 64 continues in the P2 to P3 direction over time, and again assuming an approximate static distance between the post 96 and the utility vehicle 8, the retention members 94 bias the cutting blade assembly 16 housing 64 against the exterior surface 100 of the post 96. Once the housing 64 clears contact with the post 96, which in this example would be approximately at imaginary point P3, the retention members 94 continue to automatically bias the cutting blade assembly 16 to its approximate pre-contact position with respect to the post 96, greatly reducing the amount of vegetation which remains uncut between neighboring fence posts.

Another feature of the present invention is also shown in FIG. 3. The first and second articulated joints discussed above allow the attachment frame 12 to pivot with respect to the utility vehicle 8, and further allow the secondary frame 14 and the cutting blade assembly 16 to pivot with respect to the attachment frame 12. This configuration allows the cutting blade 88 to adjust to non-planar terrain.

As discussed above, the present invention provides a non-complicated device for cutting vegetation between two or more inanimate objects. The cutting blade assembly of the present invention is automatically biased, so there is no need for complex fluid systems. Moreover, the cutting blade is attached to a vertical shaft motor, which eliminates the need for more complex pulley and belt designs. The present invention is also configured to automatically adapt to non-planar terrain, such as culverts or slopes, preferably via the first and second articulation joints.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

I claim:

1. A mower suitable for attachment to a utility vehicle and adapted to follow terrain and retract in response to an immovable obstacle, the mower comprising:

an attachment frame configured to be pivotally attached to the utility vehicle, the attachment frame having a first frame member, two spaced-apart second frame members oriented perpendicular to the first frame member, and a first wheel support positioned perpendicular to the two spaced-apart second frame members;

a secondary frame pivotally connected to the attachment frame, said secondary frame having a wheel rotatably connected thereto;

a cutting blade assembly having a housing positioned adjacent to the secondary frame, the housing being laterally movable with respect to the secondary frame; and wherein the housing retracts in a direction toward the secondary frame when contact occurs between the housing and the immovable obstacle, and automatically returns to an approximate pre-contact position when contact between the housing and the immovable obstacle is eliminated.

2. The mower as claimed in claim 1, further comprising a first wheel rotatably connected to the attachment frame.

3. The mower as claimed in claim 1, wherein the cutting blade assembly comprises:

the housing, which further defines a circular-shaped outer perimeter and a first top surface; and a motor mount having a second top surface attached to the first top surface of the housing.

4. The mower as claimed in claim 3, further comprising a plurality of rollers attached to opposing sides of the motor mount.

5. The mower as claimed in claim 3, comprising:
   a retention member post that extends from a second top surface of the motor mount; and
   a movement restriction bracket that extends from a second top surface of the motor mount.

6. The mower as claimed in claim 3, wherein the housing and motor mount define a coincident motor shaft orifice, and the cutting blade assembly further comprising a motor having a vertical motor shaft, the motor attached to the second top surface of the motor mount and the vertical motor shaft extending from the motor extends through the motor shaft orifice.

7. The mower as claimed in claim 6, further comprising a rotating cutting blade attached to a free end of the vertical motor shaft.

8. A mower adapted to follow terrain and retract in response to an immovable obstacle, the mower comprising:
   a utility vehicle;
   an attachment frame configured to be pivotally attached to one side of the utility vehicle, the attachment frame having a first frame member, two spaced-apart second frame members oriented perpendicular to the first frame member, and a first wheel support positioned perpendicular to the two spaced-apart second frame members;
   a secondary frame pivotally connected to the attachment frame, said secondary frame having a wheel rotatably connected thereto;
   a cutting blade assembly having a housing positioned adjacent to the secondary frame, the housing being laterally movable with respect to the secondary frame; and
   means for biasing the housing laterally away from the secondary frame, wherein the housing retracts in a direction toward the secondary frame when contact occurs between the housing and the immovable obstacle and automatically returns to a pre-contact position when contact between the housing and the immovable obstacle is eliminated.

9. The mower as claimed in claim 8, further comprising a first wheel rotatably connected to the attachment frame.

10. The mower as claimed in claim 8, wherein the secondary frame comprises two spaced-apart C-shaped channel members and two channel bars individually connected to each of the two spaced-apart C-shaped channel members.

11. The mower as claimed in claim 8, wherein the cutting blade assembly comprises:
    the housing which further defines a circular-shaped outer perimeter and a first top surface; and
    a motor mount having a second top surface attached to the first top surface of the housing.

12. The mower as claimed in claim 11, further comprising a plurality of rollers attached to opposing sides of the motor mount.

13. The mower as claimed in claim 11, comprising:
    a retention member post that extends from a second top surface of the motor mount; and
    a movement restriction bracket that extends from a second top surface of the motor mount.

14. The mower as claimed in claim 11, wherein the housing and motor mount define a coincident motor shaft orifice and the cutting blade assembly further comprising a motor having a vertical motor shaft, the motor attached to the second top surface of the motor mount and the vertical motor shaft extending from the motor extends through the motor shaft orifice.

15. The mower as claimed in claim 14, further comprising a rotating cutting blade attached to a free end of the vertical motor shaft and wherein the means for biasing the housing away from the secondary frame include at least two coil spring members.

16. A mower suitable for attachment to a utility vehicle and adapted to follow terrain and retract in response to an immovable obstacle, the mower comprising:
    an attachment frame configured to be pivotally attached to the utility vehicle;
    a secondary frame pivotally connected to the attachment frame, wherein the secondary frame comprises two spaced-apart C-shaped channel members and two channel bars individually connected to each of the two spaced-apart C-shaped channel members;
    a housing positioned adjacent to the secondary frame, the housing being laterally movable with respect to the secondary frame,
    wherein the housing retracts in a direction toward the secondary frame when contact occurs between the housing and the immovable obstacle, and automatically returns to an approximate pre-contact position when contact between the housing and the immovable obstacle is eliminated.

* * * * *